(12) United States Patent
Kuras et al.

(10) Patent No.: US 7,469,761 B2
(45) Date of Patent: Dec. 30, 2008

(54) CONTINUOUSLY VARIABLE TRANSMISSION SYSTEM WITH POWER BOOST

(75) Inventors: Brian Dean Kuras, Metamora, IL (US); Thomas Michael Sopko, Jr., East Peoria, IL (US); Maria-Magdalena Dilimot, Dunlap, IL (US); Michael Edward Vanderham, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 551 days.

(21) Appl. No.: 10/876,589

(22) Filed: Jun. 28, 2004

(65) Prior Publication Data

US 2005/0288148 A1  Dec. 29, 2005

(51) Int. Cl.
    *B60W 20/00* (2006.01)
(52) U.S. Cl. .................. 180/65.4; 180/65.2; 903/941
(58) Field of Classification Search ................ 180/65.2, 180/65.3, 65.4, 65.8; 701/22; 903/941, 942, 903/930
See application file for complete search history.

(56) References Cited

U.S. PATENT DOCUMENTS

| | | | |
|---|---|---|---|
| 5,806,617 A | 9/1998 | Yamaguchi | |
| 5,846,155 A * | 12/1998 | Taniguchi et al. | 477/2 |
| 5,939,794 A | 8/1999 | Sakai et al. | |
| 6,123,163 A * | 9/2000 | Otsu et al. | 180/65.8 |
| 6,343,246 B1 | 1/2002 | Matsubara | |
| 6,385,970 B1 | 5/2002 | Kuras et al. | |
| 6,424,902 B1 | 7/2002 | Kuras et al. | |
| 6,437,456 B1 * | 8/2002 | Kimura et al. | 290/40 C |
| 6,522,024 B1 * | 2/2003 | Takaoka et al. | 290/40 C |
| 6,570,265 B1 * | 5/2003 | Shiraishi et al. | 290/40 C |
| 6,662,096 B2 * | 12/2003 | Komiyama et al. | 701/54 |
| 6,684,863 B2 | 2/2004 | Dixon et al. | |
| 6,726,594 B2 | 4/2004 | Mizuno et al. | |
| 6,757,598 B2 * | 6/2004 | Okoshi | 701/22 |
| 6,827,167 B2 * | 12/2004 | Cikanek et al. | 180/65.6 |
| 2002/0123836 A1 | 9/2002 | Komiyama et al. | |

* cited by examiner

*Primary Examiner*—Jeffrey J Restifo
(74) *Attorney, Agent, or Firm*—Finnegan, Henderson, Farabow, Garrett & Dunner

(57) ABSTRACT

A method is provided of boosting power to a continuously variable transmission having a motor. The continuously variable transmission is powered by an engine. The method includes selectively adjusting a power output of the engine above a steady state power output rating of the engine when an acceleration of the motor exceeds an acceleration threshold value.

14 Claims, 9 Drawing Sheets

CONTINUOUSLY VARIABLE TRANSMISSION SYSTEM WITH POWER BOOST

TECHNICAL FIELD

This disclosure relates generally to continuously variable transmission (CVT) systems, and more specifically to a system and method for boosting power to a continuously variable transmission (CVT).

BACKGROUND

Many propelled vehicles and work machines, particularly earth working machines, use a continuously variable transmission (CVT) to drive wheels or tracks which propel the vehicle or work machine. A CVT provides an infinite number of transmission ratios to generate an output at any speed in its operating range. One example of a CVT is a hydrostatic transmission consisting of a variable speed hydraulic pump and a hydraulic motor. An example of such a hydrostatic transmission is disclosed in U.S. Pat. Nos. 6,385,970 and 6,424,902 to Kuras et al. The speed output of such a transmission can be continuously varied by controlling the displacement of the hydraulic pump.

Another example of a CVT is an electric motor and inverter as is used in hybrid-electric systems such as in hybrid-electric cars. A hybrid-electric system generally includes an internal combustion engine that is mechanically coupled to drive an electric generator that creates electrical power. The power from the electric generator is then consumed by an electric motor. An inverter contains the power electronics that control the output speed and torque of the electric motor—thus the transmission ratio is adjusted electronically by the inverter. The electric motor provides torque to drive a load, such as the wheels or tracks of a propelled vehicle. Hybrid-electric systems can be used in a variety of applications, such as automobiles, earth-working machines, or other machinery.

One problem encountered in CVT systems is that the inertia of the motor (hydraulic or electric) and the associated system components can be quite large. When the inertia is large, the acceleration response of the motor is limited. In other words, if the inertia is large, it will be difficult to accelerate the motor quickly unless the engine is sufficiently powerful. A limited motor acceleration response may be unacceptable, especially for certain applications such as construction machines like wheel loaders or utility tractors driven by the CVT system. More power can be provided to the motor simply by installing a more powerful engine and generator. This is often undesirable, however, because a more powerful engine may also be larger, heavier, and result in a less efficient system.

U.S. Pat. No. 6,726,594 to Mizuno discloses a control system for a vehicle. A controller detects whether an acceleration of a vehicle is requested. If acceleration is requested, a final target engine output power is calculated based on the accelerator pedal position and the vehicle speed. The engine speed at which the target output power can be generated with the minimum fuel consumption is calculated. A target engine torque is calculated based on the target engine output power and engine speed. A transient operating point is then determined by calculating ranges of engine torque and engine speed which can be achieved within a predetermined time. The controller then controls the speed ratio of a continuously variable transmission so as to operate the engine at the transient operating point.

Controlling the speed ratio of a CVT may not provide sufficient acceleration if the rate of fuel consumption in the engine is not increased to boost engine power output. What is needed is a system and method for improving motor acceleration in a CVT system without requiring the installation of a larger engine. What is further needed is a system and method for boosting power to a motor in a CVT system without damaging the engine. The disclosed system is directed to satisfying one or more of the existing needs in the industry.

SUMMARY OF THE INVENTION

In accordance with one aspect of the disclosed system, a method is provided of boosting power to a continuously variable transmission having a motor. The continuously variable transmission is powered by an engine. The method includes selectively adjusting a power output of the engine above a steady state power output rating of the engine when an acceleration of the motor exceeds an acceleration threshold value.

According to another aspect of the disclosed system, a method is provided of boosting power to a continuously variable transmission having a motor. The continuously variable transmission is powered by an engine. The method includes determining an acceleration of the motor. A power boost map is selected when the acceleration exceeds an acceleration threshold value, and a baseline map I selected at other times. The power boost map and baseline map represent engine power output as a function of engine speed. A speed of the engine is sensed and at least one parameter of the engine is adjusted to control the rate of fuel combustion in the engine to provide an engine power output in accordance with the selected map at the sensed engine speed.

According to another aspect of the disclosed system, a method is provided of boosting power to a continuously variable transmission having a motor. The continuously variable transmission is powered by an engine. The method includes determining an acceleration of the motor. A first engine underspeed threshold is selected when the acceleration exceeds an acceleration threshold value. A second engine underspeed threshold is selected at other times. A speed of the engine is sensed and at least one parameter of the engine is adjusted to control the rate of fuel combustion in the engine to provide an engine power output in accordance with an engine power map, wherein the engine power map represents engine power output as a function of engine speed.

According to another aspect of the disclosed system, a continuously variable transmission system is provided including an engine and a continuously variable transmission powered by the engine. The continuously variable transmission includes a motor. A controller is operative to selectively adjust a power output of the engine above a steady state power output rating of the engine when an acceleration of the motor exceeds an acceleration threshold value.

DETAILED DESCRIPTION

Reference will now be made in detail to the drawings. Whenever possible, the same reference numbers will be used throughout the drawings to refer to the same or like parts.

Figure 1:
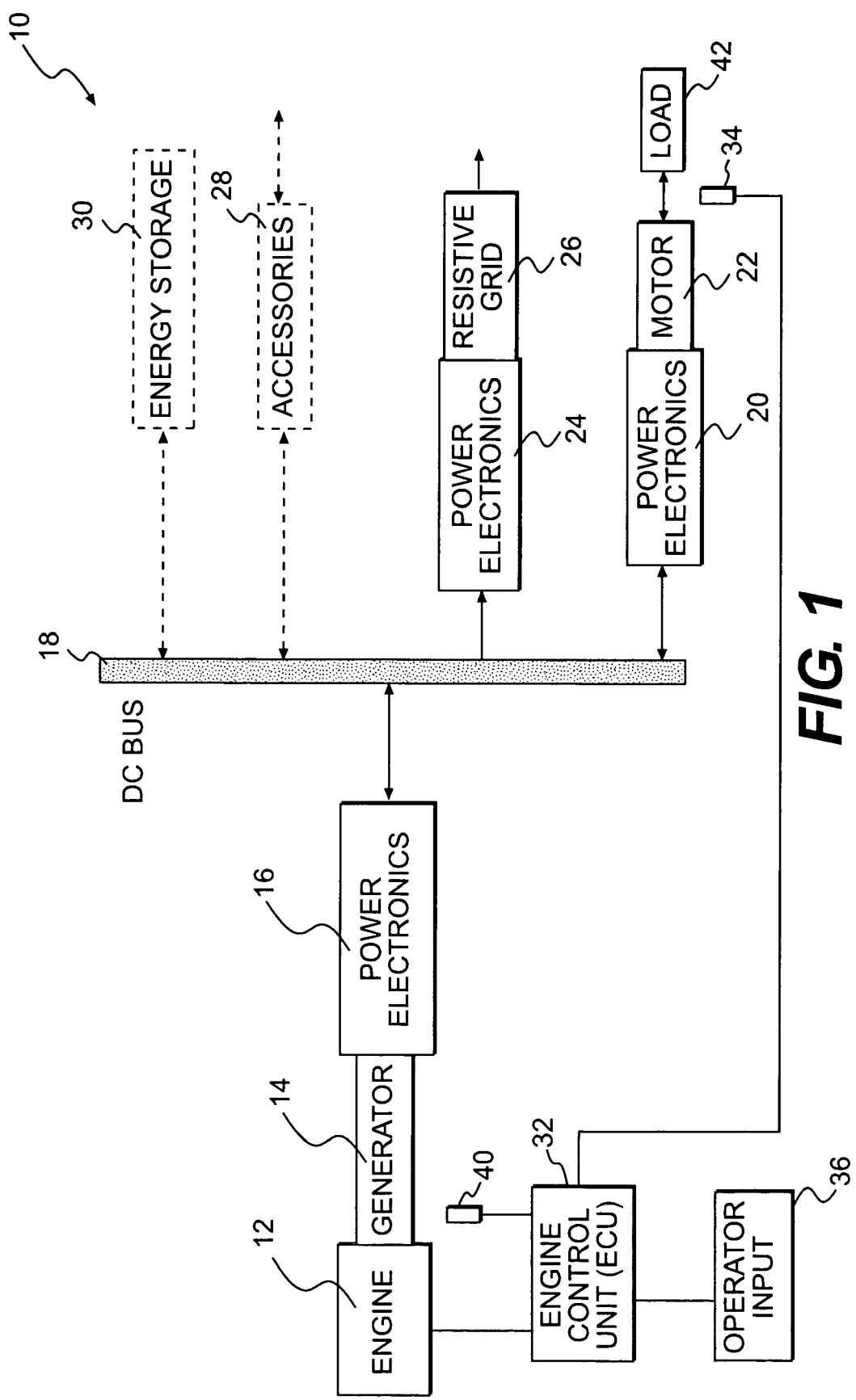
FIG. 1 depicts a block diagram illustrating a hybrid-electric system in accordance with an exemplary embodiment of the present disclosure.

FIG. 1 illustrates an exemplary CVT as embodied in a hybrid-electric system 10. An internal combustion engine 12 is mechanically coupled to an electric generator 14. Generator 14 provides electric power to a DC bus 18 via power electronics 16. DC Bus 18 may be coupled to an energy storage device 30 such as a battery. DC Bus 18 may also provide electrical power to accessories 28. DC Bus 18 may also supply electrical power to a resistive grid 26 via power electronics 24. DC Bus 18 may also supply electrical power to an electric motor 22 via power electronics 20. Motor 22 provides output torque to drive load 42. Load 42 may be, for example, a set of wheels or tracks in a propelled vehicle. The continuously variable transmission includes generator 14, power electronics 16 and 20, and motor 22. Power electronics 16 and 20 are controlled to provide the desired output speed for motor 22.

Engine control unit (ECU) 32 is a microprocessor controller that controls engine 12. Engine control unit 32 can control a variety of engine parameters such as the rate of fuel flow, the timing of fuel injection to individual cylinders, the throttle position, and the rate of air flow. Motor speed sensor 34 senses the output speed of motor 22 and provides a signal indicative of actual motor speed to ECU 32. Engine speed sensor 40 senses the output speed of engine 12 and provides a signal indicative of engine speed to ECU 32. An operator input 36 provides an operator input signal to ECU 32. Operator input 36 may be, for example, an accelerator pedal. An operator can depress the accelerator pedal to request an increase in the speed of motor 22, which increases machine speed.

The torque produced by the motor 22 is equal to:

$$T_{motor} = I_{motor}\alpha + T_L$$

where:

$T_{motor}$=torque produced by motor $I_{motor}$=motor inertia $\alpha$=motor acceleration $T_L$=load torque To increase the acceleration of electric motor 22, more torque needs to be produced by motor 22. This requires that more power be delivered to motor 22 from engine 12 via generator 14. Some engines 12 are capable of operating above their normal rated power output for relatively short or intermittent periods of time without causing damage to the engine. For example, an engine 12 that is rated to output 175 horsepower (hp) during steady state operation may be able to run at 250 hp for intermittent periods of time. Thus, when it is desired to accelerate motor 22, engine 12 can be boosted above its steady state power output rating during the motor acceleration period. Since motor 22 will typically only be accelerating for a relatively short period of time, engine 12 will be able to handle outputting the increased power demand for the acceleration period. This enables the use of a smaller engine 12, thereby providing greater efficiency. A smaller engine 12 may be used because engine 12 can be sized for steady state (non-accelerating) motor operation, rather than being sized for accelerating motor operation. If engine 12 were sized for accelerating motor operation, a larger engine 12 would be needed.

The motor 22 should be sized such that it is capable of powering the maximum expected load 42. The power output of motor 22, as well as the electrical power drawn by motor 22, will increase when the motor accelerates. For example, a wheel loader may require 150 kW of power for steady-state (non-accelerating) operation and 200 kW of power when the motor is accelerating. In such a case, the motor will need to be capable of providing 200 kW to power the wheel loader during acceleration. The engine 12, however, may be sized to support the 150 kW of power expended by the motor 22 during steady-state operation. The power output of engine 22 may be boosted only for the acceleration period of the motor 22. Increased power may be provided to the motor 22 from engine 12 via generator 14 according to two alternative schemes, discussed as follows.

Although a hybrid-electric system 10 is shown in FIG. 1, it will be understood that the system and method of providing a power boost disclosed herein can be applied to other types of CVTs such as a hydrostatic transmission. In such a system, motor 22 is a hydraulic motor. A hydraulic pump is coupled to engine 12. The hydraulic motor 22 is coupled to the hydraulic pump. The hydraulic motor 22 drives the load 42. The speed output of the hydraulic motor 22 can be continuously varied by controlling the displacement of the hydraulic pump.

Figure 2:
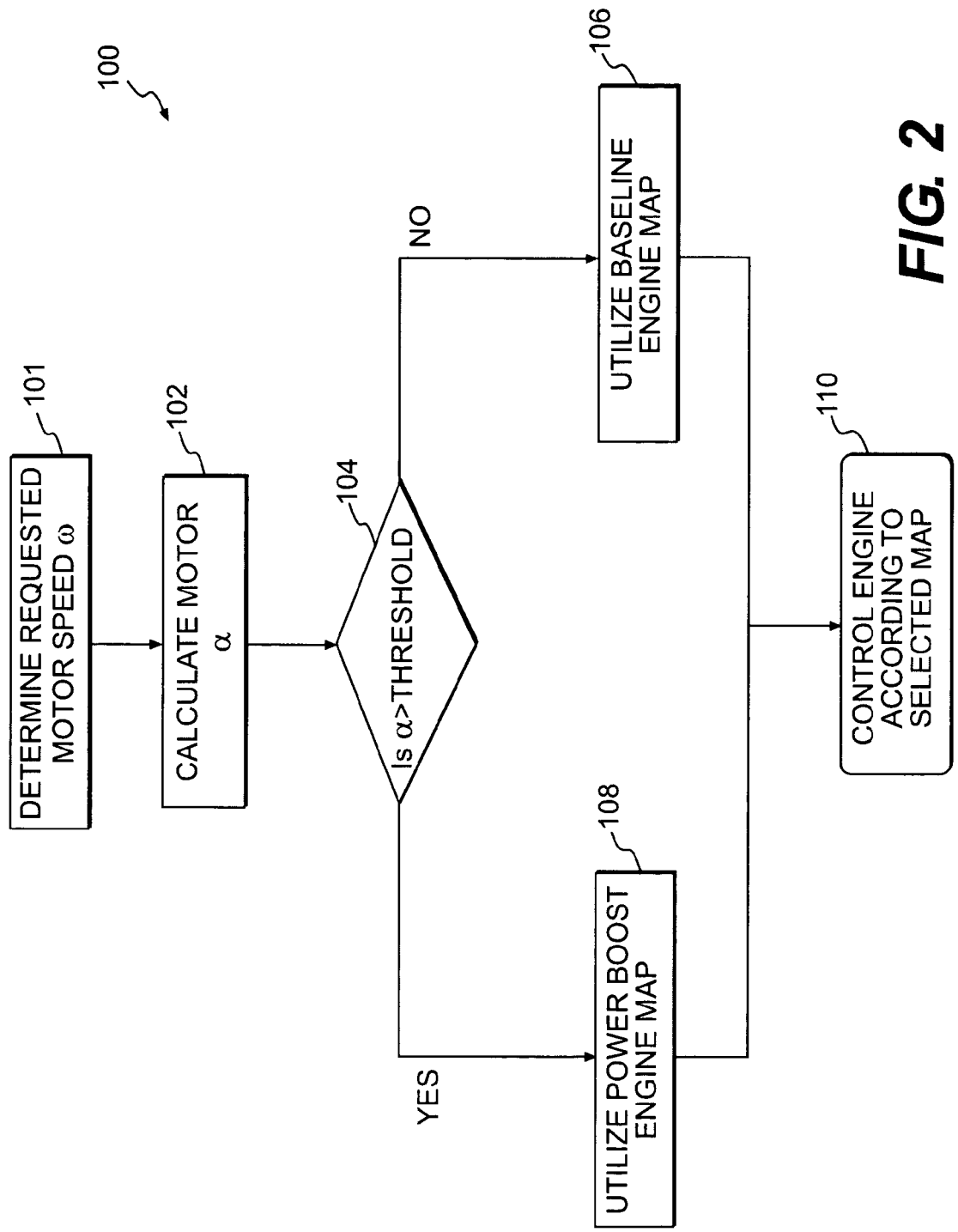
FIG. 2 depicts a flow chart illustrating a scheme for boosting power to a continuously variable transmission in accordance with an exemplary embodiment of the present disclosure.

FIG. 2 depicts a flow chart 100 illustrating a first scheme for providing increased power to motor 22. In step 101, a requested motor speed ω is determined. The requested motor speed ω can be determined based on the operator input signal received from operator input 36 (FIG. 1). For example, the amount of depression of an accelerator pedal could be used to determine the requested motor speed ω. In step 102, an acceleration α of the motor is calculated. The acceleration α may be calculated based on the rate of change of the requested motor speed ω or the rate of change of actual (sensed) motor speed as measured by motor speed sensor 34. If the acceleration α is calculated based on the rate of change of requested motor speed ω, then the acceleration a represents a requested or predicted acceleration. For example, if the requested motor speed ω is 500 rpm at time $t_1$ and 600 rpm at time $t_2$, the requested acceleration α will be equal to $(600-500)/(t_2-t_1)$. Alternatively, the acceleration α can be calculated based on the actual (sensed) motor acceleration rather than the requested or predicted motor acceleration. The actual motor acceleration is simply the rate of change in sensed motor speed over time.

In step 104, the acceleration α is compared to an acceleration threshold value. If the acceleration α is greater than the acceleration threshold value, then in step 108, a power boost engine map is selected. If the acceleration α is less than the acceleration threshold value, then in step 106, a baseline engine map is selected. In step 110, the engine is controlled according to the selected map. The acceleration threshold value may be as low as zero. In that case, whenever motor 22 is accelerating or about to accelerate (due to a change in the operator input signal), the power boost map will be selected to boost the power output of engine 12. Alternatively, a higher acceleration threshold may be used so that the power boost map will only be selected when it is desired to accelerate the motor 22 aggressively.

Figure 3:
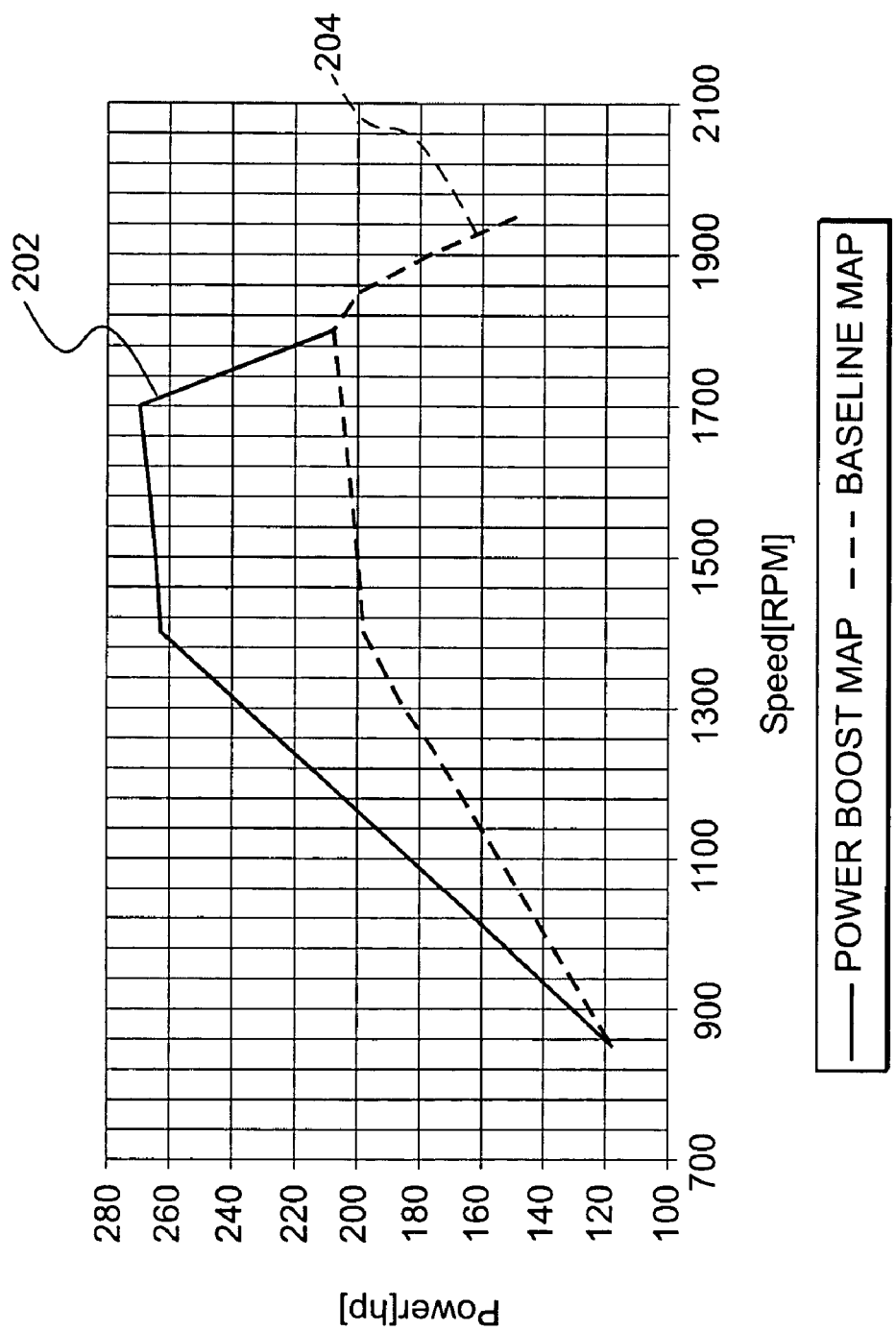
FIG. 3 depicts an example of a power boost map and a baseline map.

FIG. 3 illustrates an example of a power boost map 202 and a baseline map 204. Both maps represent engine output power as a function of engine speed. These maps may be contained within a memory device accessible by ECU 32. ECU 32 controls engine power output based on the selected map 202 or 204. The engine power output is based on the rate of fuel consumption in the engine. ECU 32 controls the rate of fuel consumption by adjusting various engine parameters, such as the rate of fuel flow and the rate of air flow to the engine. More specifically, ECU 32 may control the fuel injection quantity, the timing of the fuel injection, the opening of the throttle valve, the air flow, and the air pressure. The sensed engine speed provided from engine speed sensor 40 is used to identify the engine power output on the selected engine power map, either the baseline map 204 or the power boost map 202. As can be seen, when the power boost map 202 is selected, the ECU 32 adjusts engine parameters to provide a boosted engine power output that is a larger power output than when then baseline map 204 is selected. The power boost map 22 may direct ECU 32 to provide a boosted engine power output that is above the steady state power output rating of the engine.

Referring to the exemplary maps shown in FIG. 3, if engine 12 is operating at a speed of 1500 rpm, the power boost map 202 indicates that the engine power output is approximately 265 hp whereas the baseline map 204 indicates that the desired engine power output is approximately 200 hp. Thus, if engine 12 is operating at 1500 rpm, and it determined that the motor acceleration α is greater than the acceleration threshold value, then ECU 32 will control the engine parameters to provide an engine power output of 265 hp. If the motor acceleration α is less than the acceleration threshold value, ECU 32 will control the engine parameters to provide an engine power output of 200 hp. If engine 12 has a steady state power output rating of 250 hp, it will be operating above its steady state output rating when the power boost map is selected at 1500 rpm. As mentioned above, the motor acceleration α can be either a requested or predicted acceleration or an actual (sensed) motor acceleration.

Figure 4:
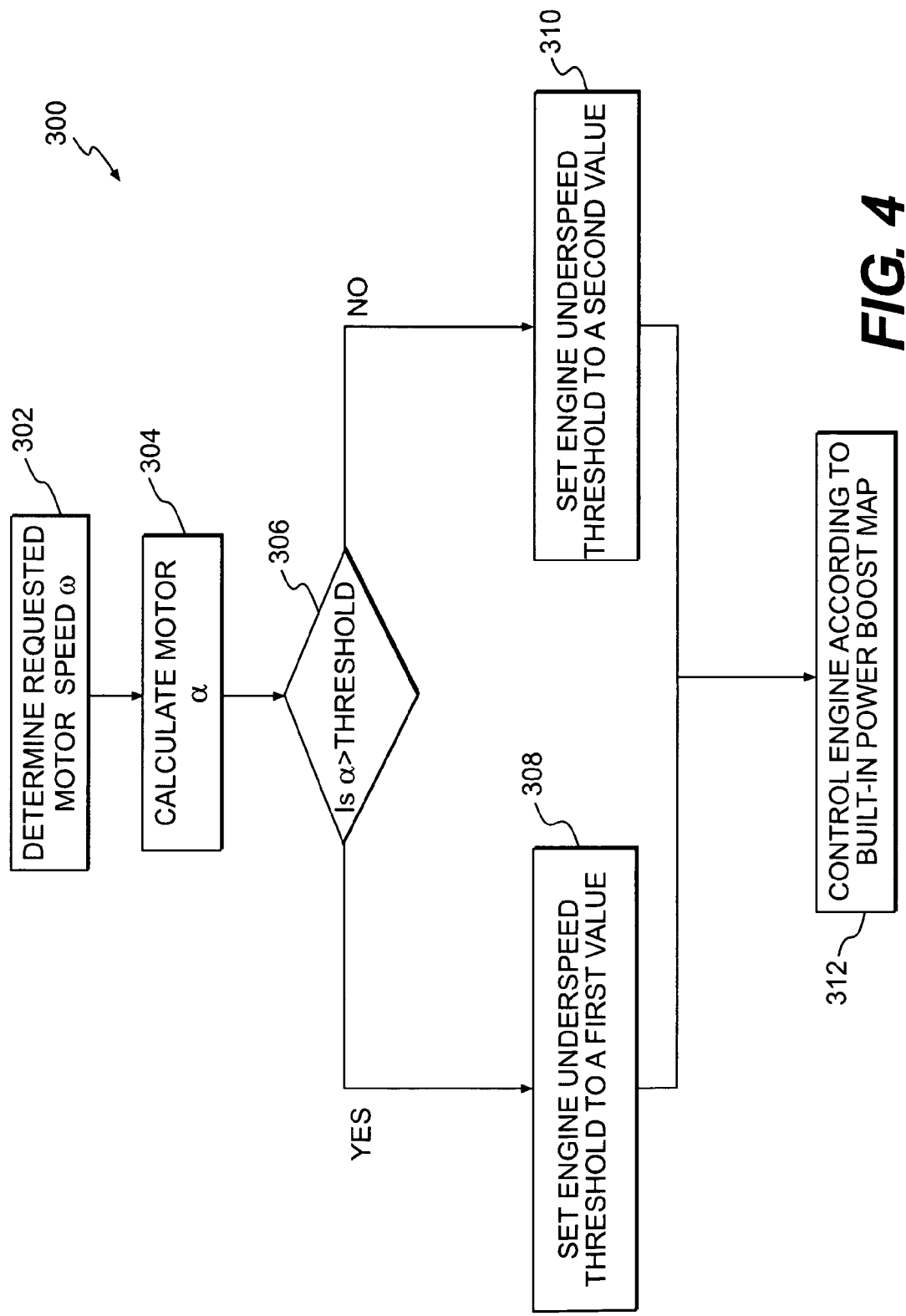
FIG. 4 depicts a flow chart illustrating an alternate scheme for boosting power to an continuously variable transmission in accordance with an exemplary embodiment of the present disclosure.

An alternative scheme for providing boosted engine power to motor 22 is depicted in FIG. 4. The method depicted in FIG. 4 uses a single engine power map referred to as the "built-in" power boost map 402 (see FIG. 5) in conjunction with an adjustment to an engine underspeed threshold used by an engine underspeed control algorithm. The engine underspeed control algorithm prevents the engine 12 from lugging or stalling by reducing the speed of motor 22, thereby reducing the load on engine 12. When a significant load 42 is picked up by motor 22, engine 12 will become loaded and may start to lug or may even stall. When the engine speed drops below a threshold value, the engine underspeed control scheme reduces the speed of motor 22 to allow engine 12 to regain its speed and operate at or near the underspeed threshold. The engine underspeed control scheme thereby enables engine 12 to operate at its most efficient speed and prevents engine 12 from stalling.

FIG. 4 depicts a flowchart 300 illustrating the alternative scheme for providing boosted power to motor 22 during motor acceleration. In step 302, a requested motor speed ω is determined. In step 304, a motor acceleration α is calculated. As described above, the motor acceleration α can be calculated as the requested or predicted motor acceleration or the actual (sensed) motor acceleration. In step 306, the motor acceleration α is compared to an acceleration threshold value. If the motor acceleration α is greater than the acceleration threshold value, then in step 308, the engine underspeed threshold is set to a first value, for example, 1500 RPM. If the acceleration α is less than the acceleration threshold value, then in step 310, the engine underspeed threshold is set to a second value, for example, 1700 rpm. In step 312, the engine is controlled according to the built-in power boost map 402 as illustrated in FIG. 5.

Figure 5:
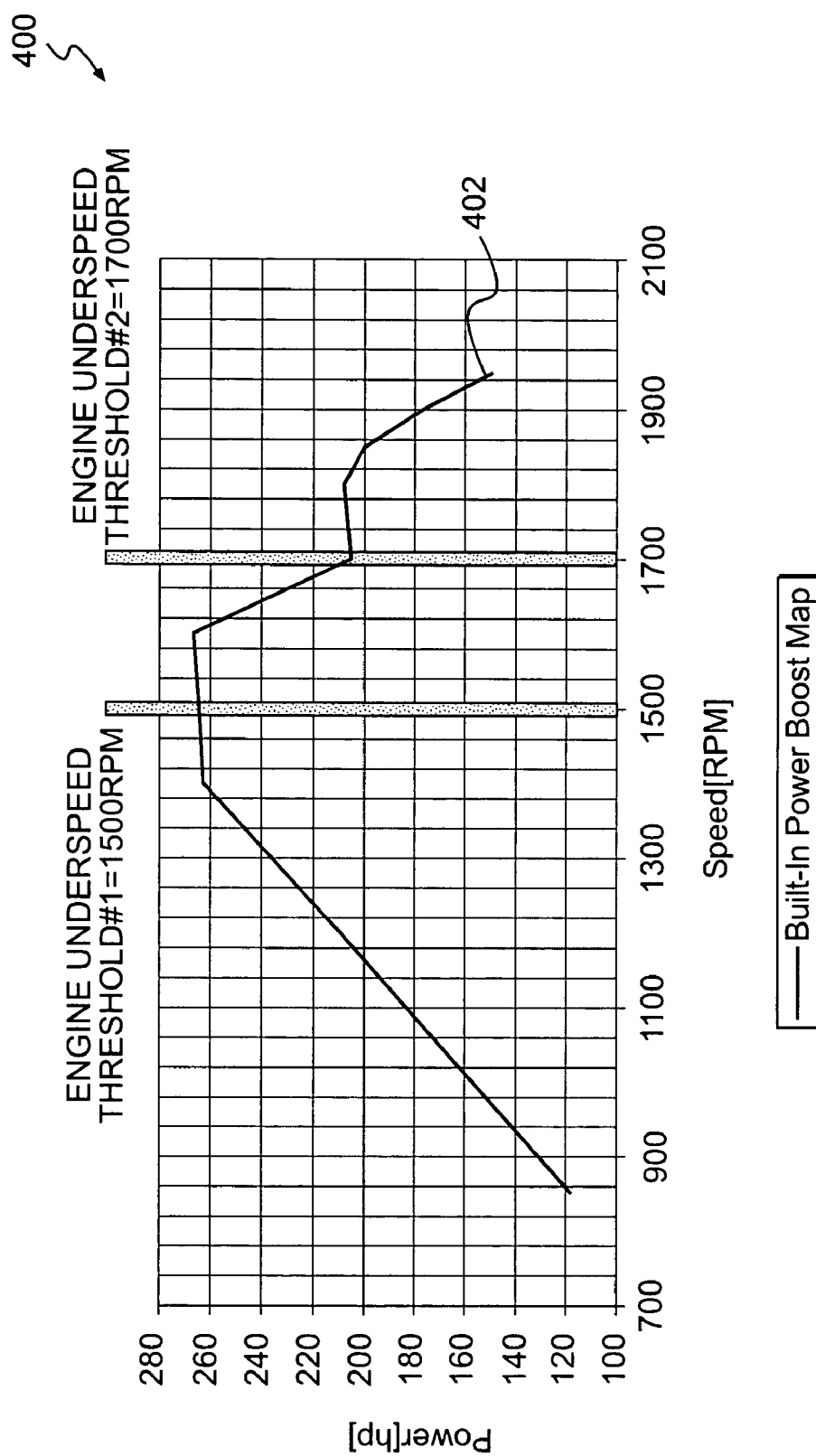
FIG. 5 depicts a built-in power boost map showing engine power vs. engine speed in accordance with an exemplary embodiment of the present disclosure.

FIG. 5 illustrates the built-in power boost map 402 that is used in conjunction with the alternate power boost scheme of FIG. 4. As described above, when the actual or requested motor acceleration α is less than the acceleration threshold value, the engine underspeed threshold will be set to the second value, which for purposes of example, is 1700 rpm. If a significant load 42 is picked up and engine 12 begins to lug, the engine underspeed control scheme will lower the motor speed to allow the engine to increase back to its 1700 rpm operating speed. When the actual or requested motor acceleration α is greater than the acceleration threshold value, the engine underspeed threshold will be set to the first value, for example, 1500 rpm. When the motor 22 begins accelerating, the increased load on the engine 12 may cause the engine speed to drop. If the actual or requested motor acceleration α exceeds the acceleration threshold value, the engine underspeed control scheme will try to prevent the engine from operating below 1500 rpm. It will be understood that the values of 1700 rpm and 1500 rpm are picked by way of example only and other threshold values may be used.

As can be seen in FIG. 5, the built-in power boost map 402 provides increased power at 1500 rpm (approximately 265 hp), as compared to the power provided at 1700 rpm (approximately 205 hp). If the motor begins accelerating and the engine speed drops due to the increased load, the engine power indicated by the built-in power boost map 402 ramps up as engine speed decreases. This can be seen by looking at the shape of built-in power boost map 402. The engine underspeed control algorithm will prevent the engine speed from dropping below 1500 rpm when the first engine underspeed threshold value is selected. As shown in the example map 402 shown in FIG. 5, at 1500 rpm, the built-in power boost map directs the ECU 32 to adjust engine parameters to provide a boosted engine power output of approximately 265 hp. This power output may be above the rated power of the engine and should not be continued indefinitely. Since the boosted power output is only provided during motor acceleration, engine 12 will be protected.

Thus, it can be seen that increased power is provided by the engine 12 when the actual or requested motor acceleration α is greater than the acceleration threshold value and engine speed drops to the increased load. The engine power boost is built into a single engine power map rather than using two separate maps as illustrated in FIG. 3. That is why the power map 402 shown in FIG. 5 is referred to as the "built-in power boost" map 402.

INDUSTRIAL APPLICABILITY

FIGS. 6A-6D display a computer simulation that was performed of a continuously variable transmission having a motor 22 that was accelerated from 0 rpm to approximately 4100 rpm under the following three engine power map schemes: 1) baseline; 2) power boost; and 3) built-in power boost. Under the baseline scheme, only the baseline engine map 204 (FIG. 3) was used. Under the power boost scheme, the power boost map 202 (FIG. 3) was used during the acceleration of motor 22. Under the built-in power boost scheme, a single engine power map 402 as shown in FIG. 5 was used.

Figure 6A:
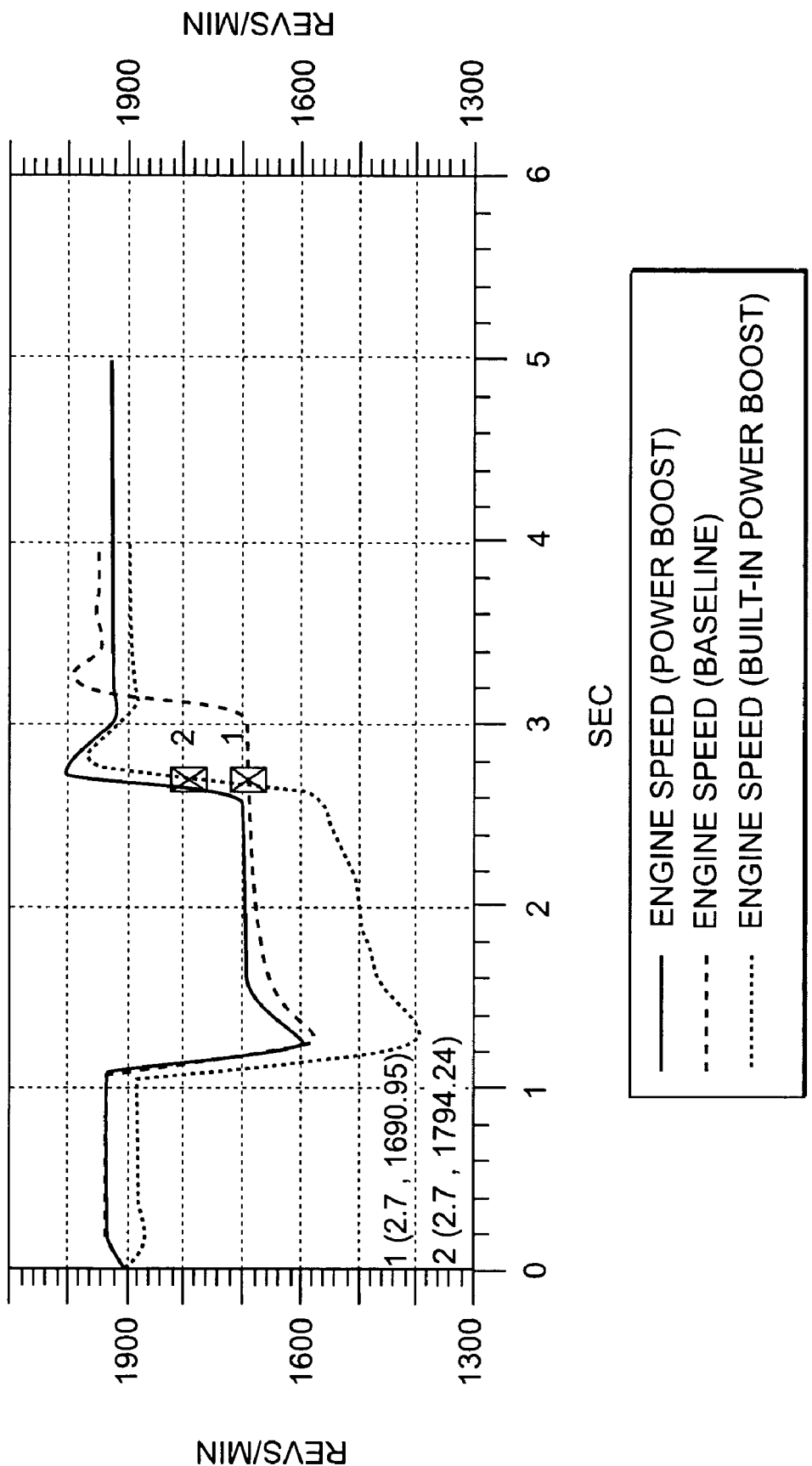
FIG. 6A depicts a simulation showing engine speed over time during motor acceleration using the baseline, power boost, and built-in power boost engine maps.
Figure 6B:
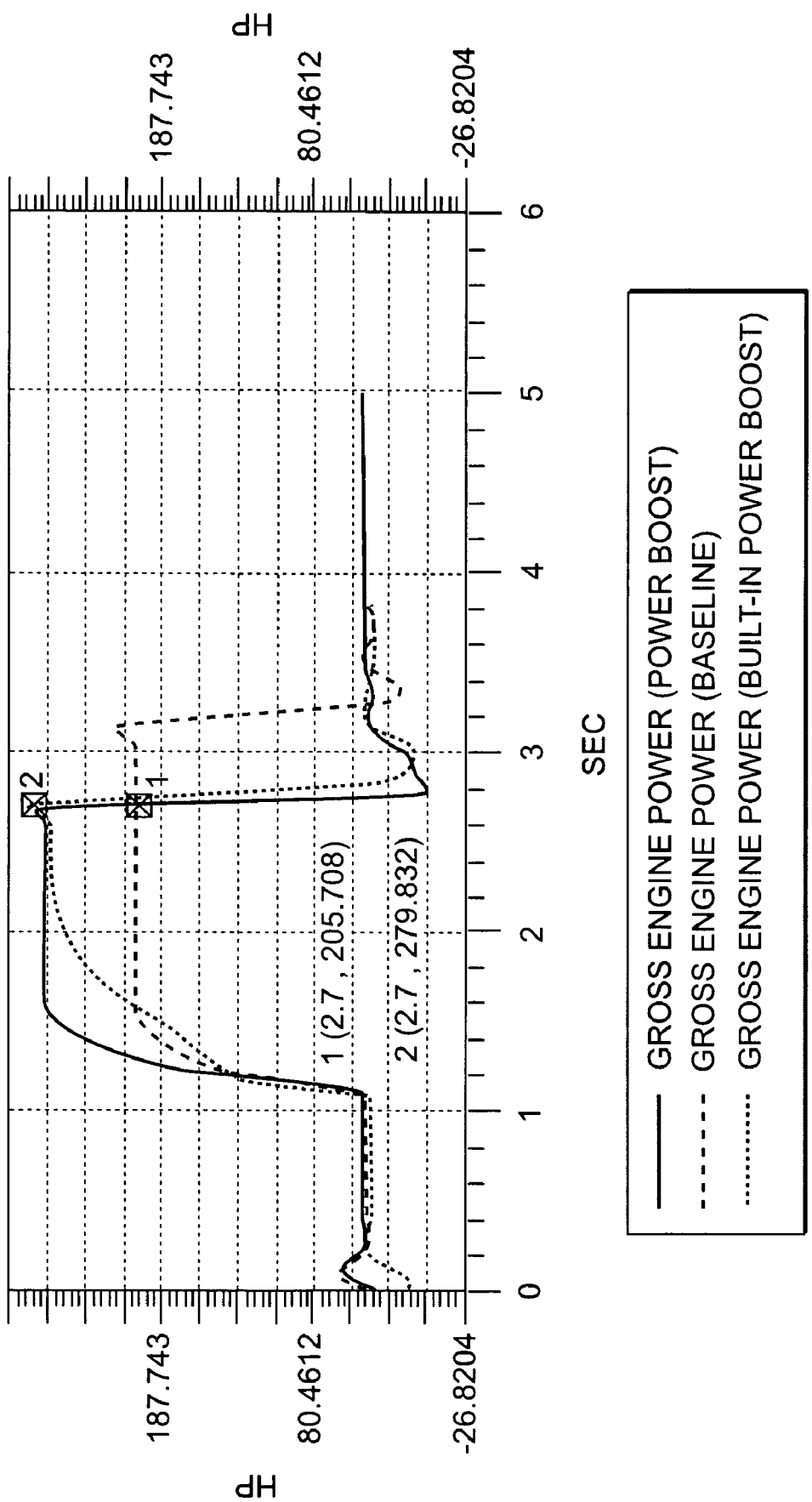
FIG. 6B depicts a simulation showing gross engine power over time during motor acceleration using the baseline, power boost, and built-in power boost engine maps.
Figure 6C:
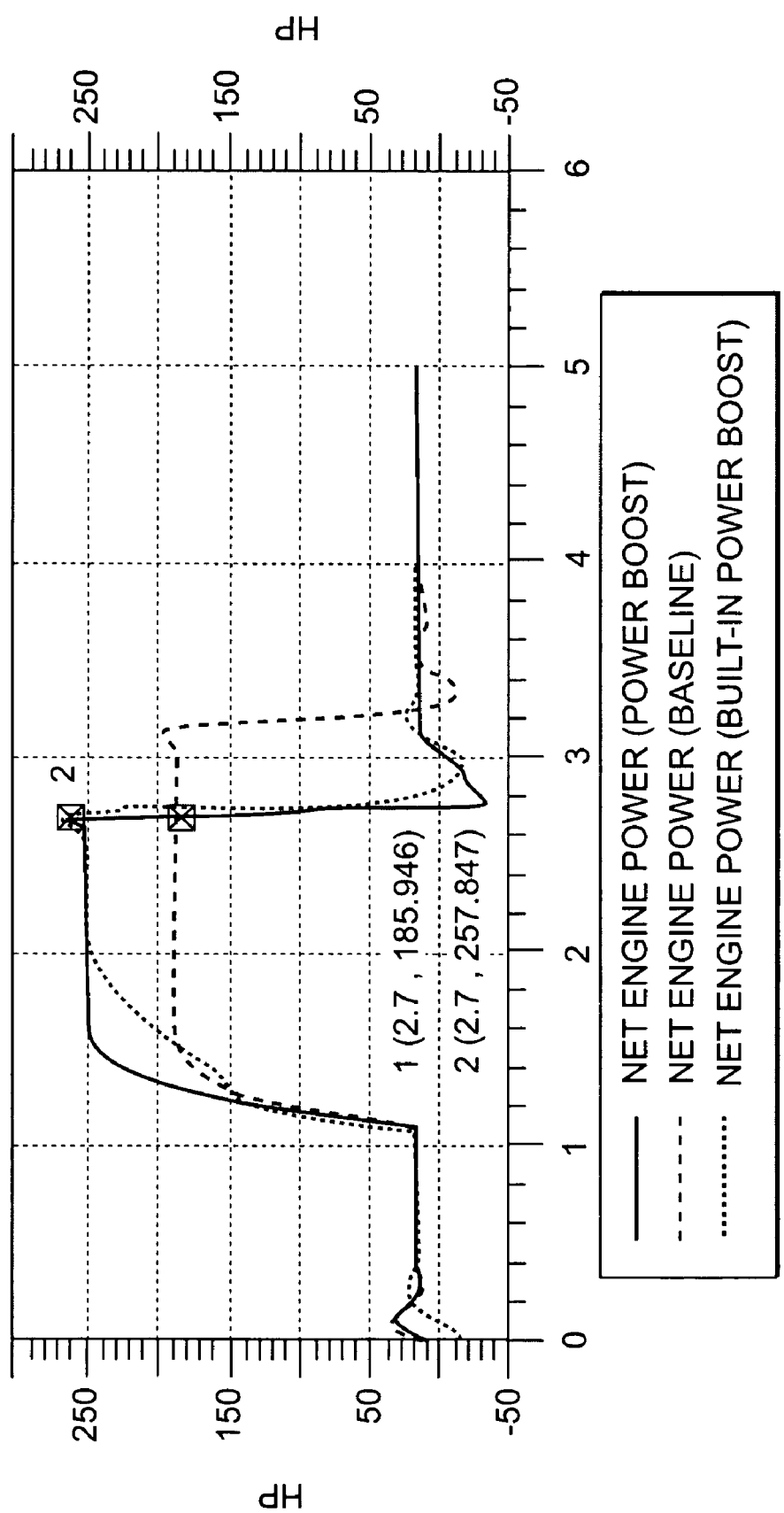
FIG. 6C depicts a simulation showing net engine power over time during motor acceleration using the baseline, power boost, and built-in power boost engine maps.
Figure 6D:
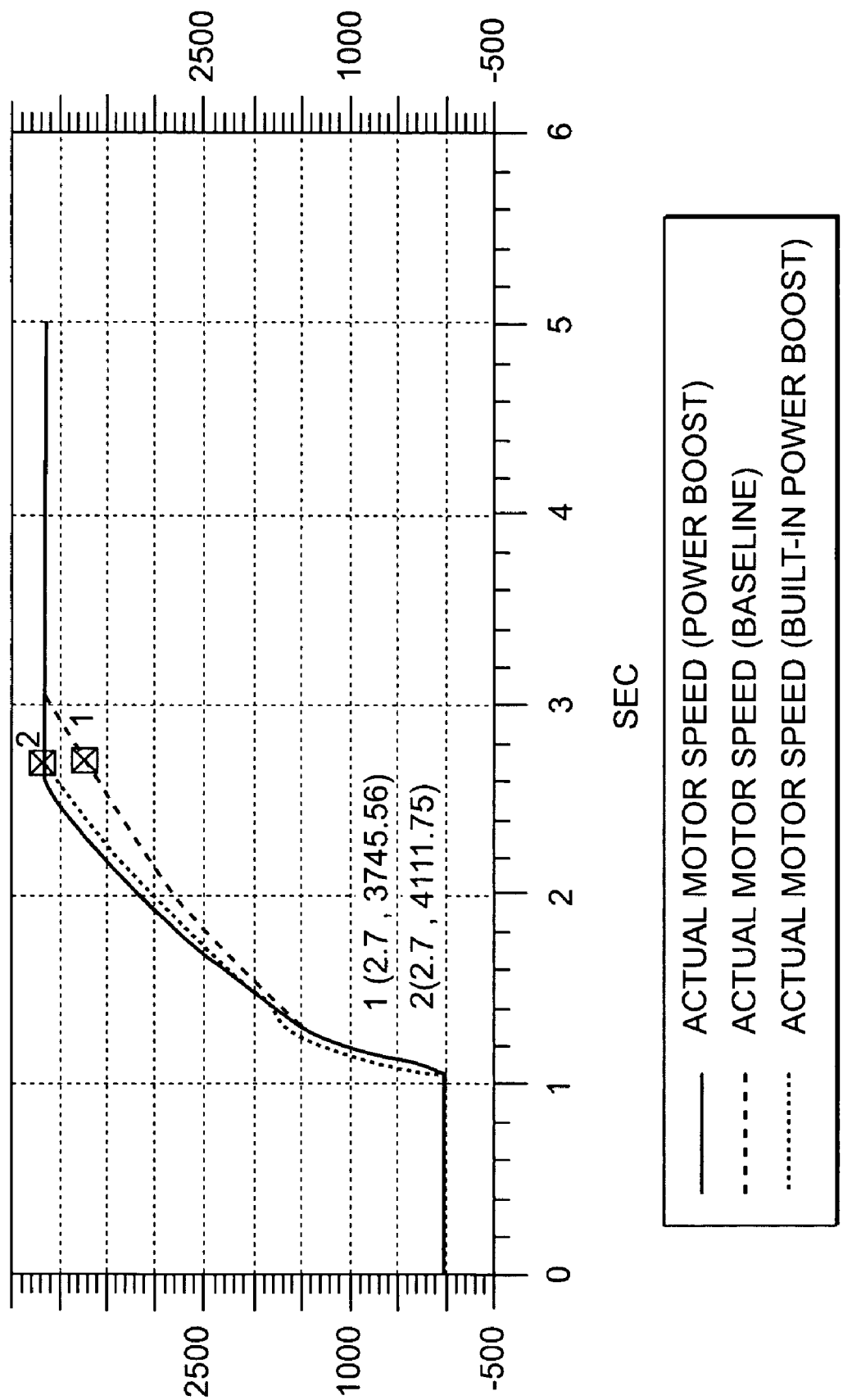
FIG. 6D depicts a simulation showing actual motor speed over time during motor acceleration using the baseline, power boost, and built-in power boost engine maps.

FIG. 6A shows the engine speed as a function of time. Under all three schemes, the engine speed drops when the motor accelerates due to the increased load on the engine. Engine speed drops the least under the power boost scheme. FIG. 6B illustrates gross engine power as a function of time. Under all three schemes, the engine power is increased as a result of the increased load on the engine. Engine power is increased the most for the power boost scheme, due to the extra power provided by the power boost map 202. FIG. 6C illustrates net engine power over time for all three schemes. Again, net engine power increases the most under the power boost scheme. FIG. 6D illustrates actual motor speed as a function of time. As can be seen, the greatest motor acceleration is provided by the power boost scheme. The built-in power boost provides slightly less acceleration, but better than the baseline scheme. Under both the power boost and the built-in power boost schemes, the motor accelerated to 4100 rpm in approximately 1.7 seconds (the difference between the start of motor acceleration at t=1 second and points 1 and 2 on FIG. 6D). Under the baseline scheme, the motor accelerated from 0 to 4100 rpm in approximately 2.1 seconds. Thus, the power boost and built-in power boost schemes provided greater motor acceleration than the baseline scheme.

The power boost schemes disclosed herein overcome the problem of slow motor acceleration caused by the large inertia of the motor and associated components in a CVT system. As an example of operation, a wheel loader has an engine 12 that is rated to output 175 hp during steady state operation and is capable of outputting 250 hp for relatively short periods of time. The wheel loader has a motor 22. Under the power boost scheme shown in FIGS. 2 and 3, the ECU 32 in the wheel loader will use the baseline engine map 204 when the acceleration α of motor 22 is less than the acceleration threshold value. The ECU 32 adjusts the engine parameters to provide an engine power output as indicated by baseline engine power map 204 at the sensed engine speed. If the motor acceleration α exceeds the acceleration threshold value, then the power boost map 202 will be selected. ECU 32 will adjust engine parameters to provide the boosted power output indicated by power boost map 202 at the sensed engine speed. The boosted power indicated by power boost map 202 may be above the steady state power output rating of engine 12. Motor acceleration α can be determined as the requested or predicted acceleration or, alternatively, the actual sensed acceleration.

Under the built-in power boost scheme illustrated in FIGS. 4 and 5, the ECU 32 in the wheel loader will use a single built-in power boost map 402. When motor 22 is not accelerating, the engine underspeed threshold will be set to a second engine underspeed threshold, for example, 1700 rpm. The engine underspeed control algorithm will try to prevent the engine speed from dropping below 1700 rpm. Engine 12 may operate at speeds approximately in the range of 1700-1800 rpm. If the motor acceleration α exceeds the acceleration threshold value, the engine underspeed threshold will be set to a first underspeed threshold, for example, 1500 rpm. The increased load on the engine caused by the motor acceleration will cause engine speed to drop. The built-in power boost map 402 directs ECU 32 to adjust engine parameters to provide increased engine 12 output power as engine speed drops below 1700 rpm. The engine underspeed control algorithm will try to prevent the engine speed from dropping below 1500 rpm.

Other embodiments of the invention will be apparent to those skilled in the art from consideration of the specification and practice of the embodiments disclosed herein. It is intended that the specification and examples be considered as exemplary only, with a true scope of the invention being indicated by the following claims.

What is claimed is:

1. A method of boosting power to a continuously variable transmission having a motor, the continuously variable transmission powered by an engine, comprising:
    selectively adjusting a power output of the engine above a steady state power output rating of the engine when an acceleration of the motor exceeds an acceleration threshold value,
    wherein the selectively adjusting the power of the engine includes:
        selecting a first engine underspeed threshold when the acceleration of the motor exceeds an acceleration threshold value, and selecting a second engine underspeed threshold at other times;
        sensing a speed of the engine; and
        adjusting at least one parameter of the engine to control the rate of fuel combustion in the engine to provide an engine power output in accordance with an engine power map, wherein the engine power map represents engine power output as a function of engine speed.

2. The method of claim 1, wherein the acceleration of the motor is a predicted acceleration, a requested acceleration, or a sensed acceleration.

3. The method of claim 1, further comprising:
    receiving an operator input signal;
    determining a requested motor speed based on the operator input signal; and
    determining the acceleration of the motor based on the rate of change of the requested motor speed.

4. The method of claim 1, wherein the engine power map provides more engine output power at the first engine underspeed threshold than at the second engine underspeed threshold.

5. The method of claim 1, further comprising:
    selectively adjusting the power output of the engine to a lever at or below the steady state power output rating of the engine when the acceleration of the motor is less than the acceleration threshold value.

6. The method of claim 1, wherein the acceleration threshold value is zero.

7. A method of boosting power to a continuously variable transmission having a motor, the continuously variable transmission powered by an engine, comprising:
    determining an acceleration of the motor;
    selecting a first engine underspeed threshold when the acceleration exceeds an acceleration threshold value, and selecting a second engine underspeed threshold at other times;
    sensing a speed of the engine; and
    adjusting at least one parameter of the engine to control the rate of fuel combustion in the engine to provide an engine power output in accordance with an engine power map, wherein the engine power map represents engine power output as a function of engine speed.

8. The method of claim 7, wherein the engine power map provides more engine output power at the first engine underspeed threshold than at the second engine underspeed threshold.

9. The method of claim 7, wherein the at least one parameter is selected from the group of (i) a rate of fuel flow to the engine, (ii) a rate of air flow to the engine, (iii) a timing of fuel injection, (iv) a throttle position, and (v) an engine air pressure.

10. The method of claim 7, further comprising:
receiving an operator input signal;
determining a requested motor speed based on the operator input signal; and
determining the acceleration of the motor based on the rate of change of the requested motor speed.

11. A continuously variable transmission System, comprising:
an engine;
a continuously variable transmission powered by the engine, the continuously variable transmission including a motor; and
a controller operative to selectively adjust a power output of the engine above a steady state power output rating of the engine when an acceleration of the motor exceeds an acceleration threshold value,
wherein the controller is operative to selectively adjust a power output of the engine by: (i) determining an acceleration of the motor; (ii) selecting a first engine underspeed threshold when the acceleration exceeds a threshold value and selecting a second engine underspeed threshold at other times; and (iii) adjusting at least one parameter of the engine to control the rate of fuel combustion in the engine to provide an engine power output in accordance with an engine power map, wherein the engine power map represents engine power output as a function of engine speed.

12. The system of claim 11, wherein the continuously variable transmission includes a generator coupled to the engine, and wherein the motor is an electric motor powered by the generator.

13. The system of claim 11, wherein the engine is sized to have a steady state rated output power sufficient to drive the motor when the motor is not accelerating.

14. The system of claim 11, wherein the engine is capable of providing power above its rated output power sufficient to accelerate the motor for intermittent periods of time without damage to the engine.

* * * * *